United States Patent [19]
Sasaki

[11] Patent Number: 6,165,581
[45] Date of Patent: *Dec. 26, 2000

[54] MAGNETIC RECORDING MEDIUM APPARATUS

[75] Inventor: Futoshi Sasaki, Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/312,771

[22] Filed: May 17, 1999

[30] Foreign Application Priority Data

May 21, 1998 [JP] Japan .................................. 10-140002

[51] Int. Cl.$^7$ ....................................................... G11B 5/82
[52] U.S. Cl. .................. 428/64.5; 428/694 BP; 428/694 BS; 428/900; 360/133
[58] Field of Search ....................... 428/694 BP, 694 BS, 428/900, 64.5; 360/133

[56] References Cited

U.S. PATENT DOCUMENTS

| | | | |
|---|---|---|---|
| 4,247,407 | 1/1981 | Naruse et al. | 252/62.54 |
| 4,303,738 | 12/1981 | Gini et al. | 428/423.1 |
| 4,309,482 | 1/1982 | Suzuki et al. | 428/413 |
| 4,696,869 | 9/1987 | Funahashi et al. | 428/695 |
| 4,741,959 | 5/1988 | Abe et al. | 428/403 |
| 4,741,977 | 5/1988 | Koga et al. | 428/694 |
| 4,772,522 | 9/1988 | Kubota et al. | 428/328 |
| 4,803,133 | 2/1989 | Hirota et al. | 428/695 |
| 5,045,372 | 9/1991 | Endo et al. | 428/64 |
| 5,091,270 | 2/1992 | Ohya et al. | 428/695 |
| 5,104,751 | 4/1992 | Ohya et al. | 428/695 |
| 5,145,738 | 9/1992 | Kato et al. | 428/336 |

FOREIGN PATENT DOCUMENTS

| | | |
|---|---|---|
| 0 168 962 A1 | 1/1986 | European Pat. Off. . |
| 0 222 564 A2 | 10/1986 | European Pat. Off. . |
| 0 244 868 A2 | 5/1987 | European Pat. Off. . |
| 0 239 123 A2 | 9/1987 | European Pat. Off. . |
| 0 345 697 A2 | 6/1989 | European Pat. Off. . |
| 0 338 526 A2 | 10/1989 | European Pat. Off. . |
| 0 379 183 A1 | 7/1990 | European Pat. Off. . |
| 0 574 930 A2 | 12/1993 | European Pat. Off. . |
| 0 665 540 A1 | 8/1995 | European Pat. Off. . |
| 29 16 146 A1 | 10/1979 | Germany . |
| 36 39 250 A1 | 5/1987 | Germany . |
| 39 24 449 A1 | 2/1990 | Germany . |
| 41 20 434 A1 | 1/1992 | Germany . |
| 55-157131 | 12/1980 | Japan . |
| 59-186130 | 10/1984 | Japan . |
| 61-156521 | 7/1986 | Japan . |
| 62-36726 | 2/1987 | Japan . |
| 62-140240 | 6/1987 | Japan . |
| 63-209022 | 8/1988 | Japan . |
| 2-96922 | 4/1990 | Japan . |
| WO 92/11631 | 7/1992 | WIPO . |

*Primary Examiner*—Stevan A. Resan
*Attorney, Agent, or Firm*—Hill & Simpson

[57] ABSTRACT

In a magnetic recording medium such as a floppy disk, a fatty acid ester compound having at least one side chain group with a molecular weight of 70 or more is added as a lubricant to a non-magnetic under layer or a magnetic recording layer in order to prevent migration of a lubricant to a liner.

9 Claims, 3 Drawing Sheets

MAGNETIC RECORDING MEDIUM APPARATUS

RELATED APPLICATION DATA

The present application claims priority to Japanese Application No. P10-140002 filed May 21, 1998, which application is incorporated herein by reference to the extent permitted by law.

BACKGROUND OF THE INVENTION

1. Field of the Invention

The present invention relates to a magnetic recording medium and a manufacturing method thereof and more particularly to a magnetic recording medium of a multilayer coating system excellent in running durability and a manufacturing method thereof.

2. Description of the Related Art

Magnetic recording apparatus attendant, for example, on computers, video or audio apparatus have been developed in recent years more and more regarding reduction of size and weight, long time operation and digitalized recording, so that recording at higher density has been demanded more also to magnetic recording media used for such high performance magnetic recording apparatus. As the magnetic recording media, coated type media have been used predominantly. The coated type magnetic recording medium uses a magnetic recording layer formed by dispersing and kneading a magnetic powder, an organic binder and various kinds of additives in an organic solvent to form a magentic tape, and coating, drying and curing the magnetic coating material on a non-magnetic support.

Also in a coated type magnetic recording medium, a demand for recording at higher density and recording at shorter wavelength has been increased more and more and a large capacity floppy disk (FD) of about 100 MB has been put to practiced use in the field of 3.5" class FD, for instance, and development has also been made to FD of further larger capacity.

One of methods for improving electromagnetic conversion characteristics of a magnetic recording medium in a high density recording region, reduction of the film thickness for the magnetic recording layer is mentioned. By decreasing the thickness of the magnetic recording layer, demagnetizing field is decreased to reduce self-demagnetization loss upon recording. Further, thickness loss due to phasal displacement is decreased upon playback to improve electro-magnetics conversion characteristic in a short wavelength region. Excellent characteristics are obtained, particularly, in FD also for overwriting Characteristics, peak characteristics and peak semi-value width characteristics by making the magnetic recording layer into a thin films.

However, one of the problems caused by reducing the thickness of the magnetic recording layer is increase of spacing loss due to unevenness on the surface of the magnetic recording layer. That is, as the thickness of the magnetic recording layer is reduced, unevenness on the underlying non-magnetic support surface is reflected just as it is on the surface property of the magnetic recording layer. Accordingly, if the surface of the non-magnetic support is coarse, the surface of the magnetic recording layer is also made coarse and, as a result, it induces deterioration in the electromagnetic conversion characteristics or drop out characteristics of the magnetic recording medium.

Further, in the large capacity FD described previously, high speed rotation is required for improving the data transmission rate. Therefore, the FD is put under severe conditions relative to the sliding movement with a magnetic head, which gives an negative factor relative to the sliding movement with the magnetic heads in conjunction with the reduced thickness of the magnetic recording layer.

As described above, for attaining the reduction of the film thickness in the magnetic recording layer required in view of the electro-magnetic conversion characteristics, it is necessary to attain a high level surface design of the magnetic recording medium and excellent durability to a high speed sliding system together.

In order to cope with this demand, a multilayer coating system of interposing a non-magnetic under layer which is relatively thick and excellent in surface property between a non-magnetic support and a magnetic recording layer has been proposed in the coated type magnetic recording media. In the multilayer coating system, the surface shape of the magnetic recording layer can be designed freely not depending on the surface shape of the non-magnetic under layer. Further, it is also possible to improve the durability of the magnetic recording medium by providing various functions to the non-magnetic under layer. That is, demands for the high density recording and the durability can be made compatible by the multilayer coated type magnetic recording medium.

For preparing a multilayer coated type magnetic recording medium, a non-magnetic under layer material prepared by dispersing a non-magnetic powder and an organic binder into a solvent is coated on a non-magnetic support to form a non-magnetic under layer. Subsequently, a magnetic recording layer coating material prepared by dispersing a magnetic powder and an organic binder into a solvent is coated on the non-magnetic under layer described above to form a magnetic recording layer. In the case of a FD, the non-magnetic under layer and the magnetic recording layer are formed on both surfaces of the non-magnetic support. Further, as another example of the multilayer coated type magnetic recording medium, a magnetic under layer may be formed with a magnetic powder different from the magnetic powder for the upper layer, and a magnetic recording layer is disposed thereon.

Subsequently, calendering, heat curing and like other treatment are applied and then the laminate is put to a slitting step into a tape shape in the case of a magnetic recording tape or put to a punching step into a disk-like shape in the case of a FD, which is then contained in a cassette or a shell to complete a desired magnetic recording medium.

By the way, if fine dusts are deposited on the magnetic recording layer, drop-out (missing pulse), injury in the magnetic recording layer and, further, injury on the truck surface of a magnetic head may sometimes occur.

Therefore, also in FD, various attempts have been made for the shell structure in order to prevent intrusion of dusts into the shell.

Further, a non-woven fabric of long fibers referred to as a liner is usually contained so as to put a magnetic disk therebetween. Since the magnetic disk rotates in loose contact with the liner, the liner sweeps off dusts on the magnetic disk to keep the surface of the magnetic disk clean.

However, direct contact of the magnetic disk surface with the liner induces an additional problem. For instance, there is a phenomenon that a surface lubricant on the surface of the magnetic recording layer indispensable to the running durability is migrated to or scraped by the liner to worsen the running property. Particularly, in a large capacity FD requiring high speed rotation, depletion of the surface lubricant is a problem that has to be solved by all means.

SUMMARY OF THE INVENTION

The present invention has been proposed in view of the foregoing background. That is, the object of the present invention is to provide a high density magnetic recording medium capable of preventing migration of a lubricant to mechanical parts such as a liner and having long lasting lubricating performance and running performance, as well as a manufacturing method thereof.

For attaining the foregoing object, the present inventor has made various studies including the molecular structure of the lubricant and has accomplished the present invention.

That is, in accordance with the present invention, there is provided a magnetic recording medium in which a non-magnetic under layer and a magnetic recording layer are coated successively and formed on a non-magnetic support, wherein at least one of the non-magnetic under layer and the magnetic recording layer contains: a fatty acid ester compound having at least one side chain group with 70 or more molecular weight.

In accordance with the present invention, there is also provided a method of manufacturing a recording medium comprising a step of successively coating a non-magnetic under layer coating material and a magnetic recording layer coating material on a non-magnetic support, wherein at least one of the non-magnetic under layer and the magnetic recording layer contains: a fatty acid ester compound having at least one side chain group with 70 or more molecular weight.

In accordance with the present invention, there is also provided another method of manufacturing a recording medium comprising a step of successively coating a non-magnetic under layer coating material, a magnetic recording layer coating material and a top coat solution on a non-magnetic support, wherein the top coat solution contains: a fatty acid ester compound having at least one side chain group with 70 or more molecular weight.

In any of the features of the present invention, the side chain group is, preferably, a hydrocarbon group or a fatty acid ester group.

If the molecular weight of the side chain group is less than 70, the effect of reducing migration of the lubricant to the liner is insufficient.

There is no particular restriction on the upper limit of the molecular weight of the side chain group. However, as the molecular weight of the entire lubricant molecules increases, since the viscosity increases excessively or the lubricant becomes solid at a normal temperature, it is not suitable as a lubricant for high speed sliding movement. In addition, it also imposes restriction in view of the manufacturing process such as difficulty in the internal addition to the magnetic recording layer coating material or dissolution into the top coat solution. Accordingly, the molecular weight is desirably within a range not greater than the molecular weight of the main skeleton of the lubricant molecule, namely, a molecular weight of about several hundreds or less in view of the numerical value.

It is not always apparent that why migration of the lubricant to the liner or the like is reduced in the magnetic recording medium according to the present invention. It is, however, considered that the mode of maintaining the lubricant in the magnetic recording layer or the non-magnetic under layer, the mode of adsorption on the surface of the magnetic recording layer and, further, the mode of adsorption with the liner are changed by the design of the molecular weight such that a side chain group of a relatively large molecular weight is introduced as the lubricant.

DETAILED DESCRIPTION OF THE PREFERRED EMBODIMENTS

The present invention will now be explained by way of preferred embodiments with reference to the drawings.

Figure 1A:
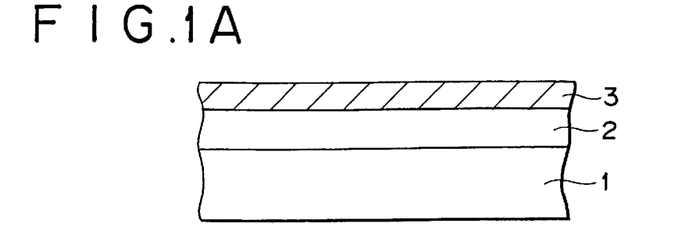
FIG. 1A and FIG. 1B are schematic cross sectional views illustrating the layer constitution of a magnetic recording medium according to the present invention.
Figure 1B:
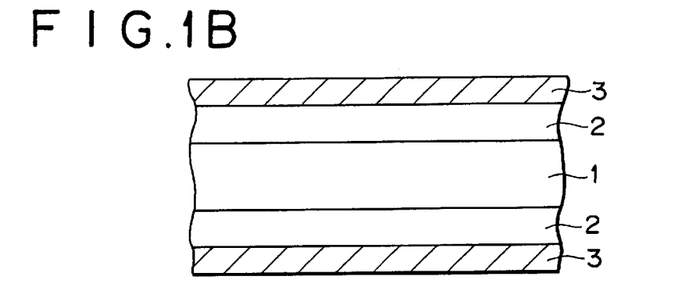

The constitution of the magnetic recording medium according to a the present invention is to be explained referring to schematic cross sectional views of FIGS. 1A and 1B. FIG. 1A shows a recording medium having one side coating applied to a magnetic tape or a hard disk (HD) and FIG. 1B is a magnetic recording medium having both side coating applied to FD or the like.

In FIGS. 1A and 1B, a non-magnetic under layer 2 and a magnetic recording layer 3 are formed successively on a non-magnetic support 1. They can be prepared by coating a non-magnetic under layer coating material and a magnetic recording layer coating material successively on the non-magnetic support 1 or by further coating a top coat solution thereon. Further, a surface protection layer or the like may also be formed further on the magnetic recording layer 3. In the case of the one side coated medium shown in FIG. 1A, a back coat layer may be formed on the other side of the non-magnetic support 1.

The fatty acid ester compound having side chain groups each of a molecular weight of 70 or more as the feature of the present invention is contained in one or both of the non-magnetic under layer 2 and the magnetic recording layer 3. Further, the fatty acid ester having side chain groups each of molecular weight of 70 or more as the feature of the present invention is contained in the surface of the magnetic recording layer 3, or the surface lubricating layer on the surface of a protection layer (not illustrated).

The magnetic recording layer 3 comprises, for example, a non-magnetic powder, an organic binder and various kinds of additives.

As the magnetic powder, any of magnetic materials such as oxide series, metal series or inter-metallic compound series magnetic powder known so far can be used. The oxide series magnetic powder can include, for example, $\gamma\text{-}Fe_2O_3$, $Fe_3O_4$, $\gamma\text{-}Fe_2O_3/Fe_3O_4$ solid solution or such iron oxide compound containing or deposited with Co, Ba ferrite and $CrO_2$.

The metal series magnetic powder can include, for example, Fe, Co, Ni and alloys thereof, or such elemental metal or alloy further incorporated or coated with elements such as Cr, Ti, Mn, Cu, Zn, Al, B and Si, MnBi and MnAl.

As the inter-metallic compound series magnetic powder, iron nitride, iron carbide and iron boride can be exemplified.

The particle shape of the magnetic powders is selected, for example, from granular, acicular, flat or plate shape.

Among them, the acicular or plate shape capable of obtaining orientation effect by magnetic fields or configuration is desirable. Preferred acicular particles have a length of a major axis of about 0.01 to 0.5 μm, preferably, 0.03 to 0.3 μm in average, and an aspect ratio of about 3 to 30, preferably, 5 to 10, and their distribution is preferably arranged sharply.

Further, a hexagonal plate-shape of magnet plumbite system is typical as the plate-shape and those having a diagonal length of the about 20 to 300 nm, preferably, about 30 to 100 nm and a plate shape ratio (diagonal line length/plate thickness) of about 2 to 30, preferably, about 3 to 10 are selected. Also in this case, the distribution is preferably aligned sharply. In any of the magnetic powders, the specific surface area measured by the BET method is preferably 45 $m^2/g$ or more with a view point of high density recording.

The magnetic characteristics of the magnetic powder are selected depending on the aimed application use of the magnetic medium, and the coercive force about from 400 to 2000 Oe and the saturated magnetization moment about from 60 to 200 emu/g are selected. If it is formed as the magnetic recording layer, it may exhibit any of the horizontal magnetic anisotropy or vertical magnetic anisotropy, and those excellent in the squareness Rs of a hysteresis loop and remanent magnetic flux density Br are preferred.

Any of dispersants known so far can be used for satisfactorily dispersing the magnetic powder into the magnetic recording layer coating material. The addition amount of the dispersant is appropriately from 0.5 to 5.0% by weight based on the magnetic powder.

In order to prevent static charges on the magnetic recording medium, an electrostatic agent may be added. Any of known antistatic agent may be used and the addition amount may be from 0.01 to 40% by weight based on the organic binder.

For improving the durability of the magnetic recording layer, addition of an abrasive is also preferred. A typical example of the abrasive is $Cr_2O_3$ but with no particular restriction thereto. The average grain size of the abrasive is selected from 0.03 to 0.6 μm, preferably, from 0.05 to 0.3 μm. The addition amount is from 3 to 20 parts by weight, preferably, from 5 to 10 parts by weight based on 100 parts by weight of the magnetic powder.

In addition, a stabilizer, a mildewproofing agent or rust preventive agent may be added as necessary to the magnetic recording layer.

The non-magnetic under layer of one side is constituted with a non-magnetic powder and an organic binder.

The non-magnetic powder material can include, for example, carbon black, graphite, hematite, boemite and various kinds of alumina such as molten alumina, α-, β-, γ-alumina, mica, kaoline, talc, clay, inorganic compound such as silica, magnesium oxide, titanium oxide (rutile and anataze type), zinc oxide, zinc sulfide, calcium carbonate, magnesium carbonate, barium carbonate, barium sulfate, lead sulfate and tungsten sulfate, a polymeric resin such as polyethylene, polyvinyl chloride, polyimide or polytetrafluoroethylene, starch or non-magnetic metal.

The non-magnetic powder may be surface treated with an Si compound or Al compound. The amount for the surface treatment is selected within a range from 0.1 to 10% by weight based on the non-magnetic powder.

The shape of the non-magnetic powder may be spherical, normal polyhedral or acicular shape, acicular shape being preferably selected. By the use of the acicular non-magnetic powder, the surface property of the non-magnetic under layer is improved and, as a result, the surface property of the magnetic recording layer laminated on the non-magnetic under layer is also made more smooth. When the acicular non-magnetic powder is used, the shape of the particles is selected such that the major axis is less than 0.5 μm and, preferably, less than 0.3 μm, and the aspect ratio is from 2 to 20, preferably, from 5 to 10. The specific surface area of the non-magnetic powder is from 10 to 250 $m^2/g$, preferably, 30 to 100 $m^2/g$ according to the BET method.

The mixing amount of the non-magnetic powder is appropriately from 55 to 99% by weight and, preferably, from 70 to 95% by weight based on the weight of the entire ingredient constituting the non-magnetic under layer. If the amount is selected within the range, the surface property of the non-magnetic under layer and the magnetic recording layer is satisfactory.

The fatty acid ester compound having at least one side chain group with the molecular weight of 70 or more is contained in one or both of the magnetic recording layer or the non-magnetic under layer as the lubricant. Alternatively, the compound may be contained in the top coat layer formed on the surface of the magnetic recording layer. Examples of the fatty acid ester compounds can include, for example, isostearyl stearate, isostearyl oleate, isocetyl stearate and trimethylol propane tri-isostearate. The compounds may be used alone or in admixture with known lubricants.

If the compound is added directly to the magnetic recording layer coating material or the non-magnetic under layer coating material, the addition amount is selected from 0.2 to 10% by weight, preferably, 0.5 to 5% by weight based on the magnetic powder or the non-magnetic powder. When this is coated as the top coating layer on the magnetic recording layer, the amount of the lubricant is from 0.5 to 200 $mg/mm^2$, preferably, from 30 to 100 $mg/mm^2$. The amount of the lubricant is selected within such a range as providing satisfactory running property, endurance and not lowering power due to excess exudation to the surface of the magnetic recording layer.

There is no particular restriction on the organic binder material used for the magnetic recording layer and the non-magnetic recording layer and any of thermoplastic resins, thermosetting resins and reactive type resins used so far can be used. The thermoplastic resin is desirably used in admixture with the thermosetting resin or the reactive type resin. The molecular weight of the resin is selected within a range from 5,000 to 200,000 and, preferably, from 10,000 to 100,000 and, more preferably, from 15,000 to 50,000 in average. The thermoplastic resin can include, for example, vinyl chloride resin, vinyl acetate resin, vinyl fluoride resin, vinyl chloride-vinyl acetate copolymer, vinyl chloride-vinylidene chloride copolymer, vinyl chloride-vinyl acetate-vinyl alcohol copolymer, vinyl chloride-acrylonitrile copolymer, vinylidene chloride-acrylonitrile copolymer, acrylate-acrylonitrile copolymer, acrylate-vinyl chloride-vinylidene chloride copolymer, methacrylate-vinyl chloride copolymer, methacrylate-vinylidene chloride copolymer, methacrylate-ethylene copolymer, acrylonitrile-butadiene copolymer, styrene-butadiene copolymer, polyurethane resin, polyester polyurethane resin, polyester resin, polycarbonate polyurethane resin, polycarbonate resin, polyamide resin, polyvinyl butyral resin, cellulose derivative (cellulose acetate butyrate, cellulose diacetate, cellulose triacetate, cellulose propionate or nitrocellulose), styrene-butadiene copolymer, polyester resin, amino resin and various kinds of synthetic rubbers.

Further, examples of the thermosetting resin and the reactive type resin can include, for example, phenol resin, epoxy resin, polyurethane curing type resin, urea formaldehyde resin, melamine resin, alkyd resin, silicone resin, polyamine resin, a mixture of high molecular weight polyester resin and isocyanate prepolymer, a mixture of polyester polyol and polyisocnate, a mixture of a low molecular weight glycol, high molecular weight diol and isocyanate, as well as mixtures of such resins.

Among the resins, polyurethane resin, polycarbonate resin, polyester resin and acrylonitrile-butadiene copolymer which are considered to provide soft and flexibility are preferably used.

The resin described above may contain polar functional groups such as $-SO_3M$, $-OSO_3M$, $-COOM$ or $-PO(OM')_2$ for improving the dispersibility of the non-magnetic particles (in which M represents H or alkali metal such as Li, K or Na, M' represents H or alkali metal such as Li, K or Na, or alkyl group). The polar functional group can include, in addition, those of side chain type groups having terminal groups of $-NR_1R_2$, $-NR_1R_2R_3^+X^-$ or those of main skeleton type groups of $>NR_1R_2^+X^-$ (in which $R_1$, $R_2$, $R_3$ each represents a hydrogen atom or hydrocarbon group and $X^-$ represents a halogen ion such as fluorine, chlorine, bromine or iodine or organic or inorganic ion). In addition, it may be a polar functional groups such as $-OH$, $-SH$, $-CN$ or epoxy group. The content of the polar functional group is from 0.1 to 8.0 mol %, preferably, from 2 to 6.0 mol %. At 0.1 mol %, no dispersing effect for the magnetic powder is observed whereas the magnetic recording layer coating material tends to gel if it exceeds 8.0 mol %.

The vinyl chloride series copolymer having the polar group is synthesize, for example, by reaction between a hydroxy group-containing copolymer such as vinyl chloride/vinyl alcohol copolymer and a compound having a polar group and a chlorine atom.

The polar group-containing polyester or polyurethane can also be synthesized from the known-method.

The organic binder may be used alone or two or more of them may be used in combination. The amount of the organic binder in the magnetic recording layer is from 5 to 30 parts by weight, preferably, from 10 to 20 parts by weight based on 100 parts by weight of the magnetic powder.

As the curing agent for cross-linking cure of the organic binder described above, a polyisocyanate or the like may be added for instance. As the polyisocyanate, an adduct of trimethylol propane and 2,4-tolylene diisocyanate (TDI) (for example, Coronate L-50: trade name) is general but an adduct of alkylene diisocyanate such as 4,4-diphenylmethane diisocyanate (MDI) or hexane diisocyanate (HDI) may also be used. In addition any of known curing agents may be used, for example, polyglycidyl amine compound such as tetraglycidyl methaxylene diamine, tetraglycidyl-1,3-bisaminomethyl cyclohexane, tetraglycidyl aminodiphenyl methane and triglycidyl-p-aminophenol, polythiol compound such as 2-dibutylamino-4,6-dimercapto substituted triazine, epoxy compound such as triglycidyl isocyanurate, a mixture of an epoxy compound and an isocyanate compound, a mixture of an epoxy compound and an oxazoline compound, a mixture of an imidazole compound and an isocyanate compound, and methyl nadic anhydride. The blending ratio of the curing agent in the organic binder is from 5 to 80 parts by weight and, preferably, from 10 to 50 parts by weight based on 100 parts by weight of the organic binder.

As the solvent for the magnetic recording layer coating material and the non-magnetic under layer coating material, there are used ketones such as acetone, methyl ethyl ketone, methyl isobutyl ketone and cyclohexanone, alcohols such as methanol, ethanol, propanol and butanol, esters such as methyl acetate, ethyl acetate, propyl acetate, butyl acetate, ethyl lactate and ethylene glycol monoacetate, ethers such as diethylene glycol dimethyl ether, glycol monoethyl ether, dioxane and tetrahydrofuran, aromatic hydrocarbons such as benzene, toluene and xylene and halogenated hydrocarbons such as methylene chloride, ethylene chloride, carbon tetrachloride, chloroform and dichlorbezene.

When the magnetic recording layer coating material and the non-magnetic under layer coating material are prepared, each of the constituent ingredients described above is mixed and kneaded into a high concentration coating material which is then diluted and dispersed into a desired solid coating material. As the kneader for preparing the high concentration coating material, an open kneader, pressure kneader, continuous kneader, 2-roll mill or 3-roll mill is adopted.

As the dispersing device for the dilution and dispersion, a ball mill, a vibration ball mill or sand mill is used.

As the non-magnetic support on which the non-magnetic under layer coating material and the magnetic recording layer coating material are coated, any of supports used in usual magnetic recording material can be used and the media can include, for example, polyesters such as polyethylene terephthalate and polyethylene-2,6-naphthalate, polyolefins such as polyethylene and polypropylene, cellulose derivatives such as cellulose triacetate and cellulose diacetate, vinylic resin such as polyvinyl chloride and polyvinylidene chloride, and organic polymers such as polycarbonate, polyamideimide and polyimide. They may be either in a single layered structure or a laminate structure. Further, a surface treatment such as corona discharge treatment may be applied to the coating surface. Further, fillers such as $SiO_2$ or latex may be incorporated in the non-magnetic support to form fine surface protrusions. The surface protrusions control the surface property of the magnetic recording layer and contributes to the improvement of the durability or the like of the magnetic recording disk.

When the organic polymer is used as the non-magnetic support for FD or magnetic card, the thickness may be about from 30 $\mu$m to 1 mm. In a case of the magnetic recording tape, a thickness from 3 $\mu$m to 30 $\mu$m is selected.

Further, in a case of a magnetic recording medium such as a hard disk, a rigid substrate made of Al series metal, ceramics or glass can be used as the non-magnetic support. The surface of the rigid substrate may be applied with an oxide membrane or Ni—P membrane by an alumite treatment, to further improve the surface hardness thereof.

There is no particular restriction on the coating method of successively forming the non-magnetic under layer and the magnetic recording layer on the non-magnetic support and any of the existent methods may be adopted, for example, a gravure coating, extrusion coating, air doctor knife coating, blade coating, air knife coating, squeeze coating, dip coating, reverse roll coating, transfer roll coating, gravure coating, kiss coating, cast coating, extrusion coating or spin coating.

The method of coating the top coating solution may also be conducted by the above-mentioned method of spray coating, as well as by LB (Langmuir-Brodget) method. The top coating solution is a solution system mainly comprising a lubricant and a solute such as rust preventive agent as required a solvent such as an alcohol or toluene.

When a multilayer coating system is employed, any of a wet-on-dry system or a wet-on-wet system may be used.

The wet-on-dry system is a method of coating and drying a non-magnetic under layer coating material on a non-magnetic support and then applying, if necessary, a calendering treatment and a curing treatment and coating a magnetic recording layer coating material on the dried coating film. Further, the wet-on-wet system is a method of coating a non-magnetic under layer coating material and, subsequently, further coating a magnetic recording layer coating material without drying in the wet state as it is.

A schematic constitution of a coating system by a wet-on-wet multilayer coating system is to be explained with reference to FIG. 2.

The entire apparatus is adapted such that various steps are applied while a long non-magnetic support 13 is transported from a supply roll 11 around which the non-magnetic support 13 is wound to a take-up roll 12. That is, a coating device 14, a magnetic orientation device 15, a drying device 16 and a calendering device 17 are arranged in this order along the transporting direction.

As the coating device 14, a coating head as a principal part of the extrusion coating system is illustrated as an example of the apparatus shown in the drawing and the device comprises a coating head 18 used for a non-magnetic under layer coating material and a coating head 19 used for a magnetic recording layer coating material. The coating head 18 used for the non-magnetic under layer coating material and the coating head 19 used for the magnetic recording layer coating material may be provided in one coating device or may be provided individually to separate coating devices.

Figure 3:
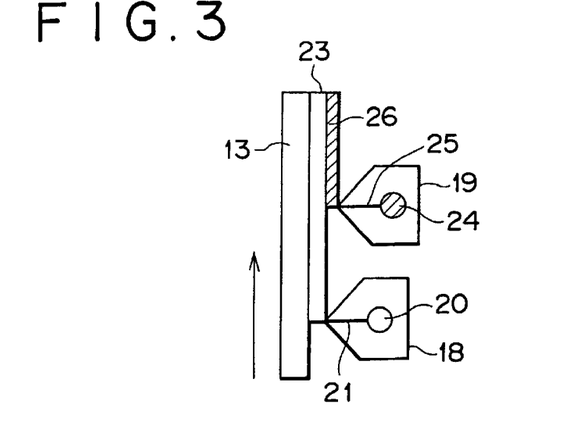
FIG. 3 is a view illustrating the outline for the operation of a coating head.

The outline for the operation of the coating head is to be explained with reference to FIG. 3.

Coating material reservoirs 20. 24 are formed, respectively, to the inside of the coating head 18 used for the non-magnetic under layer coating material and the coating head 19 used for the magnetic recording layer coating material respectively, from which slits 21, 25 are formed toward the top ends of the coating heads. Each of the coating materials supplied from the coating material reservoirs 20 and 24 is extruded by way of slits 21, 25 to the top end of the coating head.

The non-magnetic support 13 is transported in the direction of an arrow shown in the drawing with a fine gap being kept relative to the top end of the coating head. In this process, a coating film 23 of the non-magnetic under layer coating material is formed by the coating head 18 used for the non-magnetic under layer coating material, and directly thereafter, a coating film 26 of the magnetic recording layer coating material is formed by the coating head 19 used for the magnetic recording layer coating material.

Figure 4:
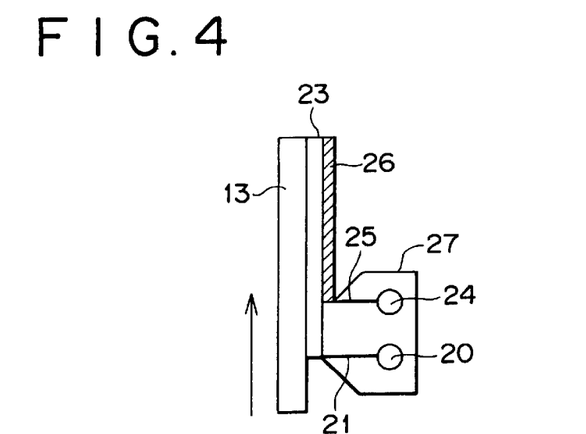
FIG. 4 is a view illustrating the outline for the operation of another coating head.

FIG. 4 is another embodiment of the coating head.

The embodiment shown in FIG. 4 is a composite type coating head 27 in which coating material reservoirs 20 and 24, and slits 21, 25 each at a predetermined space are formed to the inside of the composite type coating head 27.

Figure 5:
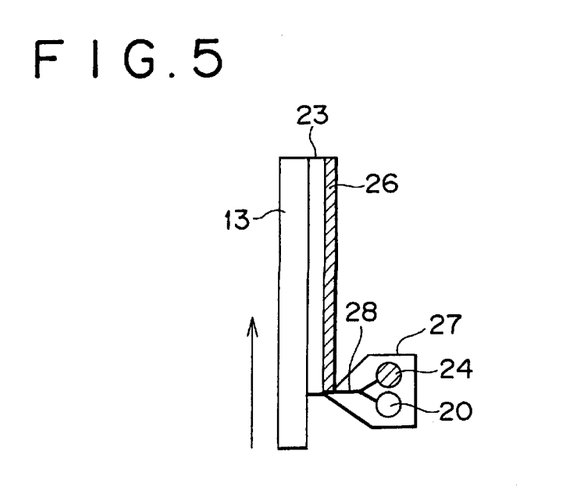
FIG. 5 is a view illustrating the outline for the operation of a further coating head.

FIG. 5 shows a further embodiment of the coating head.

The embodiment shown in FIG. 5 is also a composite type coating head 27 in which coating material reservoirs 20, 24 for the non-magnetic under layer coating material and the magnetic recording layer coating material and a slit 28 are formed to the inside of the composite type coating head 27. The coating materials in the coating material reservoirs 20, 24 are integrated in a layerous form in the slit 28 at the inside of the composite type coating head 27, and a coating film 23 for the non-magnetic under layer coating material and a coating film 26 for the magnetic recording layer coating material are formed simultaneously on a non-magnetic support 13.

EXAMPLE

Now, the method of manufacturing the magnetic recording medium according to the present invention is to be explained more specifically. Each of the examples shown below is for easy understanding of the present invention and the invention is no way restricted to such examples.

Example 1

In this example, $C_8H_{17}CH(C_6H_{13})CH_2OCOC_{17}H_{35}$ (isocetyl stearate: molecular weight of the side chain group: 85) is used as the fatty acid ester compound having at least one side chain group molecular weight of 70 or more.

The following compositions were kneaded and dispersed by a kneader and a sand mill to prepare a magnetic recording layer coating material and a non-magnetic under layer coating material.

| Magnetic Recording Layer Paint Composition (P/B = 5) | |
|---|---|
| Fe series magnetic powder | 100 parts by weight |
| (BET specific surface area: 50 m$^2$/g, coercive force: 1600 Oe) | |
| Sodium sulfonate-containing polyurethane resin | 4 parts by weight |
| Potassium sultonate containing vinyl chloride resin | 16 parts by weight |
| Carbon black (Asahi #50) | 4 parts by weight |
| α-alumina | 8 parts by weight |
| isocetyl stearate | 4 parts by weight |
| Methyl ethyl ketone | 200 parts by weight |
| Toluene | 150 parts by weight |
| Cyclohexanone | 200 parts by weight |
| Non-Magnetic Under Layer Paint Composition (P/B = 5) | |
| α-Fe$_2$O$_3$ | 100 parts by weight |
| (BET specific surface area: 52 m$^2$/g) | |
| Sodium sulfonate-containing polyurethane resin | 4 parts by weight |
| Potassium sulfonate containing vinyl chloride resin | 16 parts by weight |
| Isocetyl stearate | 4 parts by weight |
| Methyl ethyl ketone | 200 parts by weight |
| Toluene | 150 parts by weight |
| Cyclohexanone | 200 parts by weight |

A polyisocyanate compound (Coronate L, manufactured by Nippon Polyurethane Co., Ltd. was added by 5 parts by weight as a curing agent to the liquid dispersion of each of the compositions just before coating.

Figure 2:
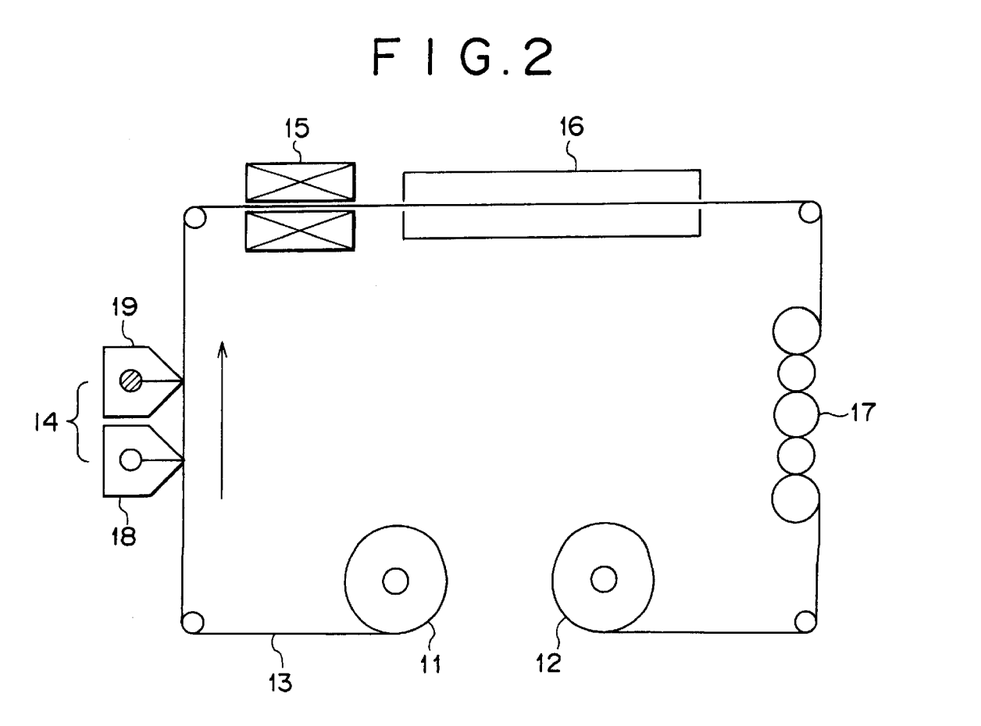
FIG. 2 is a schematic constitutional view of a coating system.

The thus prepared magnetic recording layer coating material and the non-magnetic under layer coating material were coated in multilayers on one surface of a non-magnetic support made of a polyethylene terephthalate film of 60 μm thickness by using the coating system as shown in FIG. 2. Subsequently, while the coated film is in a not yet dried state, they were mangetically oriented isotropically within the plane of the magnetic recording layer and dried. Further, each of the treatments of coating, magnetic orientation and drying was applied in the same manner on the other surface of the non-magnetic support. The thickness of the coating layer after drying was 1.5 μm for the non-magnetic under layer and 0.5 μm for the magnetic recording layer. Then, a smoothing treatment was applied on both surfaces of the magnetic recording layers by a calendering device under the conditions at 60° C.

The thus obtained magnetic sheet is punched out into a disk-shape of 3.5" diameter, applied with a heat treatment for curing in an oven at 60° C. for 20 hrs to obtain a sample sheet of Example 1.

Evaluation Method

Migration amount of the lubricant to the liner was evaluated for the sample sheet by the following method. The evaluation method is to be explained with reference to FIGS. 6A and 6B.

Figure 6A:
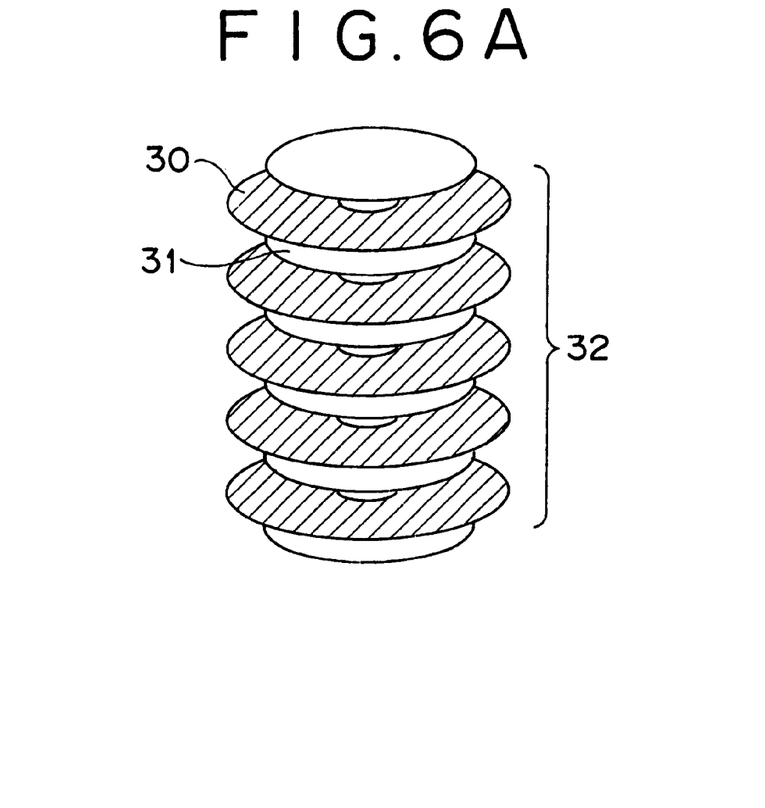
FIG. 6A and FIG. 6B are views illustrating a method of measuring migration of a lubricant from sample sheets to liners.
Figure 6B:
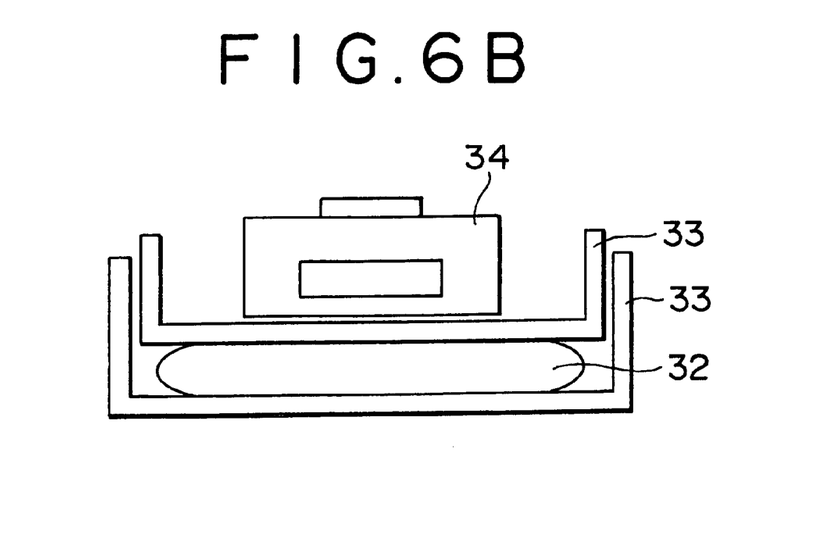

As shown in FIG. 6A, ten sample sheets 30 and eleven liners 31 were stacked alternately to prepare a stack 32 having sample sheets and the liners. The stack 32 of the sample sheets and the liners are contained and put between a petri dish 33 as shown in FIG. 6B and pressed by a weight 34 of 500 g. After storing in the state shown in FIG. 6B in a thermostable bath at 75° C. for 20 days, the sample sheets were recovered, the lubricant was extracted out of the sample sheets and the reduction ratio of the lubricant (migration rate to the liner) was calculated.

Extracting operation of the lubricant was conducted by dipping the sample sheets after storage into hexane. After drying the extraction solution once, solids were dissolved again into tetrahydrofuran. The tetrahydrofuran solution was developed by gel permeation chromatography to isolate and quantitatively measure the isocetyl stearate lubricant.

As a reference sample, a sample sheet just after preparation (before migration test) was stored with no contact to the liner in a thermostable bath at 75° C. for 20 days, and the lubricant from the reference sample sheet was quantitatively analyzed by the same method.

The reduction ratio of the lubricant was calculated according to the following equation:

$$\text{Lubricant reduction ratio} = \left|1 - \frac{\text{Extraction amount of the lubricant from sample sheet}}{\text{Extraction amount of the lubricant from reference sample sheet}}\right| \times 100\%$$

Example 2

In this example, $CH_3CH_2C(CH_2OCOC_{11}H_{23})_3$, (trimethylol propane tri-isostearate: molecular weight of the side chain group: 213) is used as the fatty acid ester compound having at least one side chain group with the molecular weight of 70 or more.

In the compound, $-(CH_2OCOC_{11}H_{23})$ groups are bonded by the number of three to $CH_3CH_2C\equiv$ group in which one of the three $-(CH_2OCOC_{11}H_{23})$ groups is regarded as a main chain and the remaining two groups are regarded as side chains. Accordingly, two side chains each with the molecular weight of 213 are present.

A sample sheet was prepared in accordance with Example 1 except for using 4 parts by weight of trimethylol propane tri-isostearate and the reduction ratio of the lubricant was calculated. Accordingly, duplicate explanations are omitted.

Example 3

In this example, $RCOOCH_2C(CH_2COOR^1)(CH_2COOR^2)(CH_2COOR^3)$ (pentaerythritol tetradecanate) is used as the compound having at least one side chain group with the molecular weight of 70 or more. In the chemical formula, each of R, $R^1$, $R^2$ and $R^3$ is a compound in which $C_7H_{15}$ and $C_9H_{19}$ present are mixed together each by 50%.

Accordingly, in the compound, two side chain groups each having molecular weight of 157 or 185 are present.

A sample sheet was prepared in accordance with Example 1 except for using 4 parts by weight of pentaerythritol tetradecanate and the reduction ratio of the lubricant was calculated. Accordingly, duplicate explanations are omitted.

Comparative Example 1

A sample sheet was prepared in accordance with Example 1 except for using 4 parts by weight of oleyl oleate (no side chain group) as the lubricant and the reduction ratio of the lubricant was calculated.

Comparative Example 2

A sample sheet was prepared in accordance with Example 1 except for using 4 parts by weight of butyl stearate (no side chain group) as the lubricant and the reduction ratio of the lubricant was calculated.

Comparative Example 3

A sample sheet was prepared in accordance with Example 1 except for using 4 parts by weight of myristic acid (no side chain group) as the lubricant and the reduction ratio of the lubricant was calculated.

Comparative Example 4

A sample sheet was prepared in accordance with Example except for using 4 parts by weight of $C_4H_9(C_2H_5)CHCH_2OCOC_{15}H_{31}$ (isooctyl palmitate: molecular weight of side chain group, 29) as the lubricant and the reduction ratio of the lubricant was calculated.

Comparative Example 5

A sample sheet was prepared in accordance with Example 1 except for using 4 parts by weight of $C_4H_9(C_2H_5)CHCH_2OCOC_{13}H_{27}$ (isooctyl myristate: molecular weight of side chain group, 29) as the lubricant and the reduction ratio of the lubricant was calculated.

The reduction ratio for lubricants for sample sheets of Examples 1 to 3 and Comparative Examples 1 to 5 prepared as described above are collectively shown in Table 1.

TABLE 1

| | Lubricant | Side chain molecular weight | Lubricant reduction ratio |
|---|---|---|---|
| Example 1 | Isocetyl acetate | 85 | 2.0% |
| Example 2 | Trimethylol propane tri-isostearate | 213 (2 molecule) | 3.5 |
| Example 3 | Pentaerythritol tetradecanate | 157 or 185 | 4.8 |
| Comp. Example 1 | Oleyl oleate | — | 32.1 |
| Comp. Example 2 | Butyl stearate | — | 40.5 |
| Comp. Example 3 | Myristic acid | — | 68.9 |
| Comp. Example 4 | Isooctyl palmitate | 29 | 25.3 |
| Comp. Example 5 | Isooctyl myristate | 29 | 20.1 |

From the results shown in [Table 1], it is apparent that sample sheets of Example 1 to Example 3 containing fatty acid ester compounds having at least one side chain groups with the molecular weight of 70 or more as a lubricant show the reduction ratio of lubricant of 4.8% or less, which is extremely low.

On the contrary, the sample sheets of Comparative Example 1 and Comparative Example 2 containing, as the lubricant, fatty acid ester compounds but of a linear structure with no side chain groups shows the reduction ratio for lubricant of about 30 to 40%, which is 10 times as large as the ratios of the examples.

Further, in Comparative Example 3, a fatty acid itself was used instead of its ester as the lubricant. It can not be determined that the reduction ratio of the lubricant is entirely caused by migration to the liner, since it is considered that myristic acid added as the lubricant may be adsorbed and secured to the magnetic powder. However, it does not satisfy the object of the invention also with a viewpoint of durability under high temperature storing conditions.

Furthermore, the compounds in Comparative Examples 4 and 5 are fatty acid ester compounds containing side chain groups. However, since the molecular weight of the side chain group is 70 or less, no satisfactory value can be obtained for the reduction ratio of the lubricant.

The magnetic recording medium and the manufacturing method thereof according to the present invention have been (explained specifically, but they are merely examples and the present invention is not restricted at all to such examples.

For instance, while the examples adopt a manufacturing method of internally adding the fatty acid ester compound having at least one side chain groups with the molecular weight of 70 or more to both of the magnetic recording layer and the non-magnetic under layer, the compound may be internally added to one of the layers. Furthermore, a method of coating a fatty acid ester compound having at least one side chain group with the molecular weight of 70 or more on the surface of the magnetic recording layer as a top coating solution may also be adopted. They may be used in combination with other lubricant.

Further, while FD is mentioned as an example of the magnetic recording medium, the present invention is applicable to any of magnetic recording media such as HD, magnetic recording tapes or magnetic cards in which a magnetic recording layer and a non-magnetic under layer are coated in multilayer, to obtain an excellent effect for improving the running property or the like. Furthermore, the present invention is also applicable to magnetic recording media of various multilayer coating systems such as having a layer structure of using a magnetic powder different from that of the magnetic recording layer to the non-magnetic under layer.

As apparent from the foregoing explanations according to the present invention, it is possible to provide magnetic recording media capable of providing stable lubricating performance and running property even under severe storage or working conditions such as use for a long time or at high temperature conditions by reducing migration of the lubricant to mechanical parts such as liners, as well as a manufacturing method of such recording media.

What is claimed is:

1. A magnetic recording medium apparatus comprising:
   a liner and a magnetic recording medium rotatably contacting said liner, said magnetic recording medium comprising a non-magnetic support, a non-magnetic under layer, and a magnetic recording layer wherein said non-magnetic under layer and said magnetic recording layer are successively coated on said non-magnetic support,
   at least one of said non-magnetic under layer and said magnetic recording layer comprising a lubricant, said lubricant comprising a fatty acid ester compound having at least one side chain group with a molecular weight of 70 or more,
   said liner being spaced apart from said magnetic recording layer wherein said liner loosely contacts said magnetic layer for preventing migration of said lubricant to said liner.

2. A magnetic recording medium apparatus according to claim 1 wherein said liner comprises a non-woven fabric.

3. A magnetic recording medium apparatus according to claim 1 wherein said magnetic recording medium comprises a floppy disk having a high density recording capacity.

4. A magnetic recording medium apparatus according to claim 1 wherein said side chain group is selected from the group consisting of a hydrocarbon and a fatty acid ester.

5. A magnetic recording medium apparatus comprising:
   a liner and a magnetic recording medium rotatably contacting said liner,
   said magnetic recording medium having a high density recording capacity comprising a non-magnetic support, a non-magnetic under layer, and a magnetic recording layer wherein said non-magnetic under layer and said magnetic recording layer are successively coated on said non-magnetic support,
   at least one of said non-magnetic under layer and said magnetic recording layer comprising a lubricant, said lubricant comprising a fatty acid ester compound having at least one side chain group with a molecular weight of 70 or more,
   said liner being spaced apart from said magnetic recording layer wherein said liner loosely contacts said magnetic layer for preventing migration of said lubricant to said liner.

6. A magnetic recording medium apparatus according to claim 5 wherein said liner comprises a non-woven fabric.

7. A magnetic recording medium apparatus according to claim 5 wherein said magnetic recording medium comprises a floppy disk.

8. A magnetic recording medium apparatus according to claim 5 wherein said side chain group is selected from the group consisting of a hydrocarbon and a fatty acid ester.

9. A magnetic recording medium apparatus according to claim 5 wherein said non-magnetic support comprises a first and second support surface and wherein said non-magnetic under layer and said magnetic recording layer are successively coated on both of said first and second support surfaces.

* * * * *